United States Patent [19]

Griffith et al.

[11] Patent Number: 4,915,783
[45] Date of Patent: Apr. 10, 1990

[54] PAPER RECYCLING AID

[75] Inventors: Edward J. Griffith, Manchester; William C. McDaniel, St. Louis, both of Mo.

[73] Assignee: Monsanto Company, St. Louis, Mo.

[21] Appl. No.: 290,558

[22] Filed: Dec. 27, 1988

[51] Int. Cl.$^4$ .............................................. D21C 5/02
[52] U.S. Cl. ............................................................. 162/8
[58] Field of Search .................... 162/8, 181.1, 181, 2, 162/189, 191, 147

[56] References Cited

U.S. PATENT DOCUMENTS

| | | | |
|---|---|---|---|
| 1,245,839 | 11/1917 | Waring et al. | 162/4 |
| 2,042,465 | 6/1936 | Hines | 162/4 |
| 2,743,178 | 4/1956 | Krodel et al. | 162/8 |
| 2,872,313 | 2/1959 | House et al. | 162/191 |
| 3,346,487 | 10/1967 | Irani et al. | 252/8.5 |
| 4,176,054 | 11/1979 | Kelley | 209/8 |
| 4,416,727 | 11/1983 | Elton et al. | 162/6 |

FOREIGN PATENT DOCUMENTS

| | | | |
|---|---|---|---|
| 49-12102 | 2/1974 | Japan | 162/8 |
| 49-12843 | 3/1974 | Japan | 162/8 |
| 56-20692 | 2/1981 | Japan | 162/8 |

*Primary Examiner*—Peter Chin
*Attorney, Agent, or Firm*—Lawrence L. Limpus

[57] ABSTRACT

A process for recycling waste paper is disclosed in which an alkali metal Kurrol's salt, preferably potassium Kurrol's salt, is added to the process water.

20 Claims, No Drawings

PAPER RECYCLING AID

BACKGROUND OF THE INVENTION

This invention relates to an improved process for recycling paper wherein an alkali metal Kurrol's salt is used as an aid in the recycling of paper for reuse in the manufacture of paper and paper products.

More particularly, this invention relates to the use of potassium Kurrol's salt as an aid in the process for the reduction of waste paper to a fibrous slurry which may again be used for the manufacture of paper and paper products. As used herein, the terms "paper" and "paper products" mean a product formed from a wet laid web of fibrous materials such as wood, bagasse, synthetic polymers such as polypropylene, polyethylene and the like, and any combinations thereof.

DESCRIPTION OF THE PRIOR ART

In modern paper making, an increasing emphasis has been placed on recycling waste paper and the processes for preparing that recycled waste paper for use in the paper making process to manufacture new paper products. For many years recycled paper, waste paper, clippings and paper broke were easily recycled to the paper manufacturing processes of paper mills by various mild chemical digestions and mechanical renderings of the recycled paper before being returned to the paper furnish. Even the use of water-soluble resins for paper coating provided no problem for those interested in recycling the various paper wastes.

A process for recycling printed paper to a usable pulp is described in U.S. Pat. No. 1,245,839. The invention is specifically concerned with the removal of ink and other printed coloring matter from paper. The paper is subjected to an aqueous soap solution which saponifies the oil or fatty portions of the ink. Air is used to separate the ink and carbon pigment from the paper by froth flotation and ozone or other gases can be used to bleach the pulp.

In U.S. Pat. No. 2,042,465, the problem of deinking uncoated waste paper is again addressed. However, it is noted that a caustic soda or soapy solution is used to slurry the paper to a pulp.

A process for defibering wet strength paper broke is set forth in U.S. Pat. No. 2,872,313. In the process, oxidizing salts in a dilute aqueous solution are utilized to loosen the fiber to resin bonds. The paper broke is preferably soaked in the oxidizing solution with mild agitation. The oxidizing salt agents can be selected from sodium hypochlorite, sodium chloride, sodium chlorate, potassium chlorate, ammonium persulfate and sodium peroxide. The solution utilized generally has a pH between 7 and 10 and elevated temperatures in the range of 46° C. to 82° C. may be utilized.

SUMMARY OF THE INVENTION

This invention is directed to a paper recycling aid for use in the process for recycling used paper into new paper products. An alkali metal Kurrol's salt, preferably potassium Kurrol's salt, is added to the process water in the recycling process to reduce the time required to convert the recycled waste paper to individual fibers within the slurry and to reduce the amount of liquid required in the process. The addition of an alkali metal Kurrol's salt such as potassium Kurrol's salt to the process water in sufficient amounts to create a solution containing from about 500 parts per million (ppm) to about 10,000 ppm by weight potassium Kurrol's salt, preferably from about 500 ppm to about 5,000 ppm by weight potassium Kurrol's salt, and more preferably about 880 ppm by weight potassium Kurrol's salt will cause the waste paper to disintegrate into individual fibers within the paper pulp slurry that is formed in a shorter time and in less liquid than has heretofore been required.

The ratio of potassium to phosphorus in the potassium Kurrol's salt useful in this invention may be varied. It is desired that the $K_2O/P_2O_5$ mole ratio be within a range of from about 0.80 to about 1.05, preferably within a range of from about 0.80 to about 0.98. During the manufacture of the potassium Kurrol's salt the $K_2O/P_2O_5$ mole ratio may be changed by varying the ratio of potassium carbonate to phosphoric acid. Therefore, for example, excess phosphoric acid may be added during the manufacture of potassium Kurrol's salt so that the mole ratio of $K_2O$ to $P_2O_5$ ($K_2O/P_2O_5$) is reduced from 1.00 to the preferred range of from about 0.80 to about 0.98.

With the addition of from about 500 ppm to about 10,000 ppm by weight potassium Kurrol's salt having a mole ratio of $K_2O/P_2O_5$ between about 0.80 and about 1.05 to the process water in the waste paper recycling process, the reduction of used paper to fibers may occur in as little as one-fifth to one-sixth the amount of liquid otherwise required for the reduced of the used paper to a fibrous state.

DESCRIPTION OF THE PREFERRED EMBODIMENTS

Potassium Kurrol's salt, or another alkali metal Kurrol's salt, is added to the process water in the process to recycle waste paper to reduce the time required to reduce the waste paper to individual fibers. The addition of the potassium Kurrol's salt can also provide the advantage of reducing the amount of water required in the process to reduce the waste paper to fibers. Other Kurrol's salts made from the alkali metal salts, that is sodium, lithium, rubidium, and cesium, may also be used; however, potassium Kurrol's salt is preferred as sodium Kurrol's salt is much more difficult to produce and the others are more expensive to produce.

Potassium Kurrol's salt is not readily soluble in water. However, the addition of diverse ions, for example, sodium ions to the water with the potassium Kurrol's salt will make the potassium Kurrol's salt go into solution very rapidly. The liquid shoul be stirred during the addition of the potassium Kurrol's salt to reduce the time required for the salt to go into solution; however, rapid stirring may cause a high sheer rate which will break the large molecules that are formed in the solution.

In the process of this invention, the process water typically contains potassium Kurrol's salt in a range of from about 500 ppm to about 10,000 ppm, and preferably from about 500 ppm to about 5,000 ppm, and more preferably about 880 ppm. It is possible to use a solution containing greater than about 10,000 ppm of potassium Kurrol's salt but the solution may be too viscous to use and it is very difficult to get the potassium Kurrol's salt into solution at that high concentration. A solution containing less than about 500 ppm of potassium Kurrol's salt may lose its efficiency and fail to provide the benefits expected from this invention because the salt may be removed from solution by absorption into the used paper and paper fibers.

Numerous materials, including lithium, ammonium, sodium, cesium, and rubidium, among others, may be used to provide the diverse ions required in the solution to make the potassium Kurrol's salt readily soluble. Sodium ions are preferred because sodium is relatively inexpensive and it is nontoxic, whereas the other alkali metals may have some toxicity.

In the following examples, the diverse ions were provided as sodium ions from tetrasodium pyrophosphate (TSPP). While TSPP was added to the solution at approximately one-half the amount of the addition of the potassium Kurrol's salt, the amount of TSPP or other source of diverse ions added to the solution may be varied greatly without affecting this invention. It is only necessary to add diverse ions in an amount sufficient to render the potassium Kurrol's salt more readily soluble. The speed at which the potassium Kurrol's salt dissolves is directly dependent upon the concentration of diverse ions in the solution more readily. Even very small amounts of diverse ions will cause the potassium Kurrol's salt to enter the solution. The addition of greater amounts of TSPP or other diverse ions will increase the speed at which the potassium Kurrol's salt enters solution; but, the expense of adding additional amounts of TSPP or other materials must be balanced against the time required for the potassium Kurrol's salt to enter the solution.

The solution of potassium Kurrol's salt may be prepared using either a basic or acidic solution, but the basic solution is preferred as it is the more stable system. Sodium is the preferred source of diverse ions and TSPP is a readily available, inexpensive source of sodium ions that is basic, dissolves easily in water, and contains a high ratio of sodium to phosphate ions. Other examples of sources of sodium ions include sodium hydroxide, sodium sulfate, sodium carbonate, sodium hexametaphosphate, disodium pyrophosphate, sodium chloride, sodium borate, sodium bicarbonate, sodium tripolyphosphate, sodium formate, sodium acetate, sodium propionate, sodium citrate, sodium tartrate, sodium oxide, sodium peroxide, sodium perborate, sodium nitrate, sodium lactate, trisodium phosphate, and disodium phosphate.

The ratio of potassium to phosphorus is important. It is preferred that the potassium Kurrol's salt added to the process water in the paper recycling process have a $K_2O$ to $P_2O_5$ mole ratio within a range of from about 0.80 to about 1.05. It is more preferred that the $K_2O/P_2O_5$ mole ratio be within a range of from about 0.80 to about 0.98. It is even more preferred that the mole ratio of $K_2O/P_2O_5$ be about 0.98. During the manufacture of the potassium Kurrol's salt, the $K_2O/P_2O_5$ mole ratio may be varied by changing the ratio of the potassium and the phosphorus compounds, for example, the ratio of potassium carbonate to phosphoric acid may be varied to change the $K_2O/P_2O_5$ mole ratio to any desired ratio within the range of from about 0.80 to about 1.05. The mole ratio may be adjusted, for example, by the addition of excess phosphoric acid during the manufacture of the potassium Kurrol's salt to reduce the $K_2O/P_2O_5$ mole ratio from 1.0 to 0.98 or less, and preferably to reduce the $K_2O/P_2O_5$ mole ratio to within the preferred range of from about 0.80 to about 0.98.

It must be noted that today's wet strength papers contain adhesives that must be chemically removed before the papers can be recycled. Similarly, some books and other papers also include adhesives in the binding and for other uses. As in earlier processes for recycling waste paper, the adhesives must be removed from the waste paper before the paper is subjected to the improved process for recycling waste paper of this invention.

The invention will be better understood by the following examples which illustrate, but do not limit, the preparation and effectiveness of this invention, the use of an alkali metal Kurrol's salt such as potassium Kurrol's salt in the process liquid of the paper recycling process in which waste paper is reduced to fibers which can then be used to produce new paper products.

EXAMPLE 1

As a control, 500 ml of distilled water were placed in a blender and 43 grams of paper towel material were added to the liquid. The blender was operated at both low speed and high speed in an effort to reduce the paper towel material to individual fibers. The paper towel material could not be reduced to individual fibers in 500 ml of water; therefore, additional water was added to the blender. The paper towel material was finally reduced to individual fibers in about 3 liters of water.

EXAMPLE 2

To demonstrate the effectiveness of this invention, 3.75 grams of potassium Kurrol's salt having a $K_2O/P_2O_5$ mole ratio of about 0.98 and 1.87 grams of tetrasodium pyrophosphate (TSPP) were added to 500 ml of distilled water in a blender and the blender was run so that all of the potassium Kurrol's salt would enter into solution. Then 43 grams of paper towel material were added to the solution while the blender was run at low speed. Within 20 minutes the blender contained an extremely thick slurry of individual paper fibers.

EXAMPLE 3

Paper towel material was torn into pieces and 43 grams of the material were added to a blender which contained 750 ml of distilled water. The blender was operated for 3 minutes. The paper towel material was not reduced to individual fibers.

EXAMPLE 4

The procedure of Example 3 was repeated and potassium Kurrol's salt having a $K_2O/P_2O_5$ mole ratio of about 0.98 was added to the water. A solution was produced by adding 0.50 grams of potassium Kurrol's salt and 0.25 grams of TSPP to 750 ml of distilled water in a blender. The blender was operated for 10 seconds so that the potassium Kurrol's salt would completely enter into solution. Paper towel material was torn into pieces and 43 grams of the material were added to the solution in the blender. The blender was operated for 3 minutes. The paper towel material was completely reduced to individual paper fibers.

EXAMPLE 5

The procedure of Example 4 was repeated with a solution having a different concentration of potassium Kurrol's salt. A solution was produced by adding 0.65 grams of potassium Kurrol's salt having a $K_2O/P_2O_5$ mole ratio of about 0.98 and 0.35 grams of TSPP to 750 ml of distilled water in a blender. The blender was operated for 10 seconds so that the potassium Kurrol's salt would completely enter into solution. Paper towel material was torn into pieces and 43 grams of the material were added to the solution in the blender. The blender was operated for 3 minutes. The paper towel material was completely reduced to individual paper fibers.

EXAMPLE 6

The procedure of Example 4 was repeated with a solution having a different concentration of potassium Kurrol's salt. A solution was produced by adding 3.75 grams of potassium Kurrol's salt having a $K_2O/P_2O_5$ mole ratio of about 0.98 and 1.78 grams of TSPP to 750 ml of distilled water in a blender. The blender was operated for 10 seconds so that the potassium Kurrol's salt would completely enter into solution. Paper towel material was torn into pieces and 43 grams of the material were added to the solution in the blender. The blender was operated for 3 minutes. The paper towel material was completely reduced to individual paper fibers.

EXAMPLE 7

The procedure of Example 4 was repeated with a solution having a different concentration of potassium Kurrol's salt. A solution was produced by adding 0.35 grams of potassium Kurrol's salt having a $K_2O/P_2O_5$ mole ratio of about 0.98 and 0.18 grams of TSPP to 750 ml of distilled water in a blender. The blender was operated for 10 seconds so that the potassium Kurrol's salt would completely enter into solution. Paper towel material was torn into pieces and 43 grams of the material were added to the solution in the blender. The blender was operated for 3 minutes. The paper towel material was only partially reduced to individual fibers.

The examples demonstrate the principle benefits received from the use of potassium Kurrol's salt, or other alkali metal salts, in the process water of the paper recycling process. The potassium Kurrol's salt aids the reduction of waste paper to individual fibers and also reduces the amount of liquid that must be used in the process to achieve the proper reduction of waste paper to individual fibers. A reduction in the liquid required provides the additional benefit to the manufacturer of reducing the amount of liquid that must be filtered or otherwise removed from the fibers so that they may be recovered and used to produce new paper products. Another benefit that is becoming more critical in today's world is that a reduction in the process liquid provides an equal reduction in the amount of process liquid that must be treated before reuse or before release of the effluent from the manufacturing site. The effluent from the process may be reduced by reusing the liquid. However, some of the potassium Kurrol's salt is absorbed by the waste paper during treatment. Thus, additional potassium Kurrol's salt must be added to the recycled solution to maintain the concentration desired in the process for recycling waste paper.

The foregoing description of this invention is not intended to limit the invention. As will be apparent to those skilled in the art, any variations on and modifications to the embodiment described above may be made without departure from the spirit and scope of this invention.

We claim:

1. In a process for recycling waste paper the improvement comprising adding an alkali metal Kurrol's salt, and a source of diverse ions in an amount sufficient to render said Kurrols' salt soluble, to the process water.

2. The process of claim 1 wherein said Kurrol's salt is potassium Kurrol's salt.

3. The process of claim 2 wherein said potassium Kurrol's salt is added to the process water in an amount sufficient to create a solution containing from about 500 ppm to about 10,000 ppm potassium Kurrol's salt.

4. The process of claim 3 wherein said potassium Kurrol's salt has a $K_2O/P_2O_5$ mole ratio between about 0.80 and about 1.05.

5. The process of claim 3 wherein said potassium Kurrol's salt is added to the process water in an amount sufficient to create a solution containing from about 500 ppm to about 5000 ppm potassium Kurrol's salt.

6. The process of claim 5 wherein said potassium Kurrol's salt is added to the process water in an amount sufficient to create a solution ontaining about 880 ppm potassium Kurrol's salt.

7. The process of claim 4 wherein said potassium Kurrol's salt has a $K_2O/P_2O_5$ mole ratio between about 0.80 and about 0.98.

8. The process of claim 6 wherein said potassium Kurrol's salt has a $K_2O/P_2O_5$ mole ratio of about 0.98.

9. In a process for recycling waste paper the improvement comprising adding from about 500 ppm to about 10,000 ppm of potassium Kurrol's salt, and a source of diverse ions in an amount sufficient to make said potassium Kurrol's salt soluble, to the process water, said potassium Kurrol's salt having a $K_2O/P_2O_5$ mole ratio between about 0.80 and about 1.05.

10. The process of claim 9 wherein from about 500 ppm to about 5000 ppm of said potassium Kurrol's salt is added to the process water.

11. The process of claim 10 wherein about 880 ppm of said potassium Kurrol's salt is added to the process water.

12. The process of claim 9 wherein said potassium Kurrol's salt has a $K_2O/P_2O_5$ mole ratio between about 0.80 and about 0.98.

13. The process of claim 12 wherein said potassium Kurrol's salt has a $K_2O/P_2O_5$ mole ratio of about 0.98.

14. In a process for making paper, a process for improving the reduction of waste paper to a fibrous slurry to recycle said waste paper comprising adding from about 500 ppm to about 10,000 ppm of potassium Kurrol's salt, and a source of diverse ions in an amount sufficient to make said potassium Kurrol's salt soluble, to the process water, said potassium Kurrol's salt having a $K_2O/P_2O_5$ mole ratio between about 0.80 and about 1.05.

15. The process improvement of claim 14 wherein from about 500 ppm to about 5000 ppm of said potassium Kurrol's salt is added to the process water.

16. The process improvement of claim 15 wherein about 880 ppm of said potassium Kurrol's salt is added to the process water.

17. The process improvement of claim 14 wherein said potassium Kurrol's salt has a $K_2O/P_2O_5$ mole ratio between about 0.80 and about 0.98.

18. The process improvement of claim 17 wherein said potassium Kurrol's salt has a $K_2O/P_2O_5$ mole ratio of about 0.98.

19. The process improvement of claim 14 wherein said source of diverse ions is selected from the group consisting of lithium, sodium, ammonium, cesium, and rubidium.

20. The process improvement of claim 19 wherein said source of diverse ions is sodium.

* * * * *